J. L. MOTT.
Cooking Stove.
No. 466.
Patented Nov. 20, 1837.
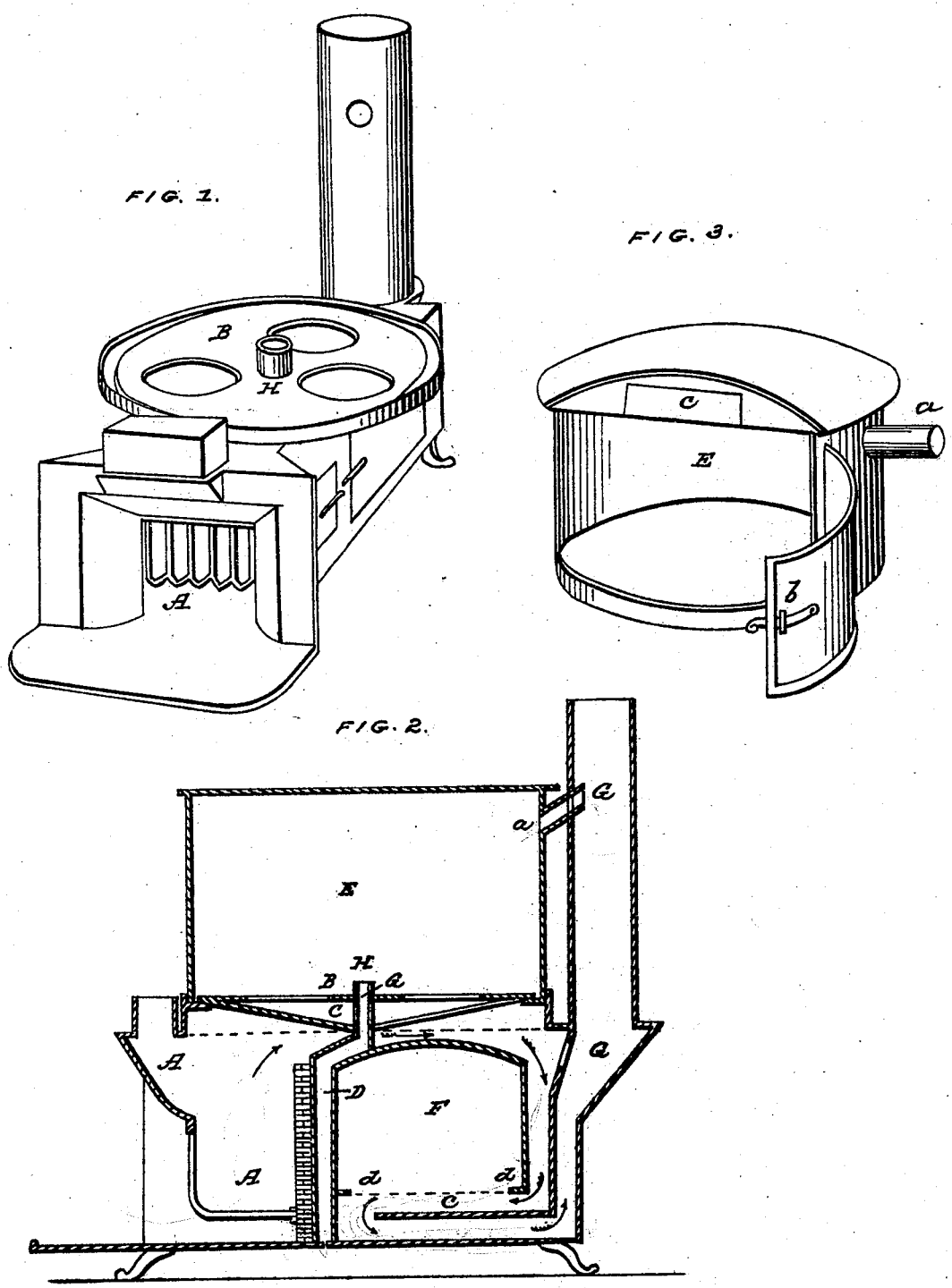

UNITED STATES PATENT OFFICE.

JORDAN L. MOTT, OF NEW YORK, N. Y.

COMBINATION COOKING-STOVE.

Specification of Letters Patent No. 466, dated November 20, 1837.

*To all whom it may concern:*

Be it known that I, JORDAN L. MOTT, of the city of New York, have invented a new and Improved Combination Cooking-Stove; and I do hereby declare that the following is a full and exact description thereof.

Figure 1 in the accompanying drawing, is a perspective view of this stove, and Fig. 2 is a vertical section thereof, through its center from front to back; the hot air oven, or drum, which is to cover the stove is shown separately in Fig. 3; it may be used or not according to circumstances.

This stove has a feeder A, through which the grate, or fire chamber, A' is to be supplied, and which will also contain a supply of fuel, B, is a rotary top plate perforated to receive cooking utensils. This top plate I make double, forming it of two or more pieces, or plates which are united at their edges, but have a space, C, between them for the reception of heated air. This heated air is admitted into the chamber, C, through lateral openings in a tube, or hollow center H upon which the top rotates; said tube is open at bottom, and connected with the chamber D, D, for heating air; there are openings in the top plate, to supply heated air within the oven or drum, E, when desired; but these openings may at any time be closed. The perforations for the reception of cooking utensils, in the rotary top plate, are surrounded by a collar, or rim uniting the two plates. To prevent the upper plate from breaking by the expansion of the lower, I design in general, to make the latter in sections, uniting these sections and plates in any convenient way. The rotary plate has a suitable rim upon which it rests, and within which it turns round. The chambed D for heated air, is unconnected with the flues, the opening or openings, through which the air to be heated is admitted into it, consists of a hole, or of a series of holes through the bottom plate of the stove directly under the space D, between the front plate of the oven F, and the back plate of the fire chamber A'.

The part marked E, and shown separately in Fig. 3, is a tin, sheet or cast iron cover oven or drum, which may be and is generally, placed over the cooking utensils; it is to have a pipe *a*, leading from it into the smoke pipe, to conduct off the steam, or to cause a current of heated air, a door, *b* is made in the side of this cover, and a segment *c* of the top plate is hinged for the purpose of getting readily at the interior.

The direction of the flues is shown by the arrows, and it will be seen that these lead into the stationary oven, F, which may be said to be an enlargement of the flue. There is not necessarily any bottom plate to this oven, separating it from the flues, and it will in general, operate better without than with such a plate, although one may, if desired, be placed upon the ledges *d, d*, and occupy the part represented by dotted lines; it may also be raised on similar ledges to decrease the size of the oven.

The plate *c* is stationary, but can be taken out for the removal of ashes &c. when necessary.

Having thus fully described and represented my said improved combination cooking stove, I hereby claim as new, and as of my invention.

1. The manner of constructing the rotary top plate, with a chamber therein for containing heated air, formed in the way described.

2. I claim the combination of such a plate with the chamber, or space, D, D for heated air. I claim also, the dispensing with the bottom plate of the oven F, and of such ovens, generally as are not placed immediately above the fire, so as to receive their heat directly therefrom, however dissimilar such stoves may be to mine in other respects, provided the reverberating flues, constructed in the manner herein shown, are made to lead into such oven, in the manner set forth.

3. I claim the combination of the rotary double top plate with an oven like that marked E, supplied with heated air from the air chamber D, D'.

JORDAN L. MOTT.

Witnesses:
SAM S. MOTT,
STEPHEN HICKS.